(12) United States Patent
Yu et al.

(10) Patent No.: US 12,266,188 B2
(45) Date of Patent: Apr. 1, 2025

(54) METHOD AND APPARATUS FOR LEVERAGING INFRASTRUCTURE CAMERA FOR VEHICLE POSITIONING

(71) Applicant: GM Global Technology Operations LLC, Detroit, MI (US)

(72) Inventors: Bo Yu, Troy, MI (US); Kamran Ali, Troy, MI (US); Vivek Vijaya Kumar, Shelby Township, MI (US); Curtis L. Hay, Washington Township, MI (US); Pei Xu, Markham (CA); Hariharan Krishnan, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 383 days.

(21) Appl. No.: 17/739,417

(22) Filed: May 9, 2022

(65) Prior Publication Data

US 2023/0360406 A1    Nov. 9, 2023

(51) Int. Cl.
  *G06V 20/00*   (2022.01)
  *B60W 40/04*   (2006.01)
  *G06V 20/58*   (2022.01)

(52) U.S. Cl.
  CPC ............. *G06V 20/58* (2022.01); *B60W 40/04* (2013.01); *B60W 2420/403* (2013.01); *B60W 2420/408* (2024.01); *B60W 2554/4041* (2020.02); *B60W 2554/4049* (2020.02)

(58) Field of Classification Search
  CPC ..... B60W 2420/403; B60W 2420/408; B60W 2556/50; G06V 20/56; G06V 20/58; G06V 10/7715; G06T 7/73; G06T 2207/10028; G06T 2207/30244; G06T 2207/30248; G06T 1/0007; G06T 7/70
  See application file for complete search history.

(56) References Cited

U.S. PATENT DOCUMENTS

| | | | |
|---|---|---|---|
| 12,137,681 B2 * | 11/2024 | Sibley | G05B 15/02 |
| 2017/0075355 A1 * | 3/2017 | Micks | G05D 1/0274 |
| 2020/0025578 A1 * | 1/2020 | Wygant | G01C 7/06 |
| 2020/0365013 A1 * | 11/2020 | Simon | H04W 76/10 |
| 2021/0150230 A1 * | 5/2021 | Smolyanskiy | G06V 20/56 |
| 2021/0264773 A1 * | 8/2021 | Zhang | G08G 1/0116 |
| 2022/0266867 A1 * | 8/2022 | Ballard | H04W 4/025 |
| 2024/0118104 A1 * | 4/2024 | Waschulzik | G06V 20/56 |

OTHER PUBLICATIONS

Caselitz, Tim, et al. "Monocular camera localization in 3d lidar maps." 2016 IEEE/RSJ International Conference on Intelligent Robots and Systems (IROS). IEEE, 2016.*

(Continued)

*Primary Examiner* — Li Liu
(74) *Attorney, Agent, or Firm* — Vivacqua Crane, PLLC

(57) ABSTRACT

A method of determining the position of a vehicle includes generating a vehicle-based point cloud of objects in proximity to the vehicle, referenced to a vehicle-based coordinate system. The method also includes receiving an infrastructure-based point cloud, referenced to a global coordinate system, of objects detected by a camera mounted at a fixed location external to the vehicle, and registering the vehicle-based point cloud with the infrastructure-based point cloud to determine the vehicle position in the global coordinate system.

14 Claims, 5 Drawing Sheets

(56) References Cited

OTHER PUBLICATIONS

Cattaneo, Daniele, et al. "Cmrnet: Camera to lidar-map registration." 2019 IEEE intelligent transportation systems conference (ITSC). IEEE, 2019.*

Guerrero-Ibáñez, Juan, Sherali Zeadally, and Juan Contreras-Castillo. "Sensor technologies for intelligent transportation systems." Sensors 18.4 (2018): 1212.*

Andre Ibisch et al., Towards Autonomous Driving in a Parking Garage: Vehicle Localization and Tracking Using Environment-Embedded LIDA Sensors, 2013 IEEE Intelligent Vehicles Symposium (IV), Jun. 2013, Gold Coast, Australia.

Byung Wook Kim et al., Vehicle Positioning Scheme Using V2V and V2I Visible Light Communications, 2016 IEEE 83rd Vehicular Technology Conference, May 2016.

Jens Einsiedler et al., External Visual Positioning System for Enclosed Carparks, 2014 11th Workshop on Positioning, Navigation and Communication, Mar. 2014.

Jens Einsiedler et al., Indoor Micro Navigation Utilizing Local Infrastructure-based Positioning, 2012 Intelligent Vehicles Symposium, Alcala de Henares, Spain, Jun. 2012.

Du, Yuchuan, et al. A novel spatio-temporal synchronization method of roadside asynchronous MMW radar-camera for sensor fusion. IEEE transactions on intelligent transportation systems, 2021, 23. Jg., Nr. 11, S. 22278-22289. DOI: 10.1109/TITS.2021.3119079.

* cited by examiner

METHOD AND APPARATUS FOR LEVERAGING INFRASTRUCTURE CAMERA FOR VEHICLE POSITIONING

INTRODUCTION

The present disclosure relates to determining the precise position of a vehicle in a GPS-denied environment.

Several vehicle driver assist systems rely on accurately knowing the position of the vehicle. Examples of such systems include lane assist, automated valet parking, and wireless electric vehicle charger alignment. Global Navigation Satellite Systems (GNSS) including Global Positioning Satellite (GPS) technologies are useful in determining vehicle position as long as sufficient GPS signals are available. Unfortunately, some vehicle operating environments are GPS-denied.

Thus, while current systems for determining vehicle position achieve their intended purpose, there is a need for a new and improved system and method for coping with GPS-denied environments.

SUMMARY

According to several aspects, a method of determining the position of a vehicle includes generating a vehicle-based point cloud of objects in proximity to the vehicle, receiving an infrastructure-based point cloud of objects detected by a sensor mounted at a fixed location external to the vehicle, and receiving position information referenced to a global coordinate system about objects included in the infrastructure-based point cloud. The method further includes registering the vehicle-based point cloud with the infrastructure-based point cloud to determine a relationship between the vehicle-based coordinate system and the global coordinate system. The method then uses the position information about the objects included in the infrastructure-based point cloud and the relationship between the vehicle-based coordinate system and the global coordinate system to determine the vehicle position in the global coordinate system, and uses the determined vehicle position in the global coordinate system to command a vehicle action.

In an additional aspect of the present disclosure, the infrastructure-based point cloud is generated by collecting image data from the sensor mounted at a fixed location external to the vehicle, performing object detection on the collected image data from the sensor mounted at the fixed location external to the vehicle, performing 2D visual feature extraction from the collected image data from the sensor mounted at the fixed location external to the vehicle, labeling the 2D visual features from the collected image data from the sensor mounted at the fixed location external to the vehicle with their object type, creating or updating an infrastructure-based 3D point cloud with the 2D visual features from the collected image data from the sensor mounted at the fixed location external to the vehicle; and calculating geographic coordinates in the global coordinate system for points in the infrastructure-based 3D point cloud with the 2D visual features from the collected image data from the sensor mounted at the fixed location external to the vehicle.

In another aspect of the present disclosure, generating the vehicle-based point cloud of objects in proximity to the vehicle includes receiving image data from a sensor mounted to the vehicle, performing 2D visual feature extraction from the image data received from the sensor mounted to the vehicle, and labeling the 2D visual features from the image data received from the sensor mounted to the vehicle with their object type. Generating the vehicle-based point cloud of objects in proximity to the vehicle further includes creating or updating a vehicle-based 3D point cloud with the 2D visual features from the image data received from the sensor mounted to the vehicle, and calculating geographic coordinates in the vehicle-based coordinate system for points in the vehicle-based 3D point cloud with the 2D visual features from the image data received from the sensor mounted to the vehicle.

In another aspect of the present disclosure, the sensor mounted to the vehicle is an optical camera.

In another aspect of the present disclosure, the sensor mounted to the vehicle is a lidar sensor.

In another aspect of the present disclosure, the sensor mounted to the vehicle is a radar sensor.

In another aspect of the present disclosure, the sensor mounted at the fixed location external to the vehicle is an optical camera.

In another aspect of the present disclosure, the sensor mounted at the fixed location external to the vehicle is a lidar sensor.

In another aspect of the present disclosure, the sensor mounted at the fixed location external to the vehicle is a radar sensor.

In an additional aspect of the present disclosure, the vehicle position is determined by a controller located in the vehicle.

In an additional aspect of the present disclosure, the vehicle position is determined by a processor located in a remote data storage pool.

In an additional aspect of the present disclosure, the vehicle position is determined by a processor located in a local data storage pool associated with the infrastructure camera.

According to several aspects, a system includes a vehicle; an image sensor mounted to the vehicle; and a controller. The controller is configured to generate a vehicle-based point cloud of objects in proximity to the vehicle, the vehicle-based point cloud referenced to a vehicle-based coordinate system, receive an infrastructure-based point cloud of objects detected by a sensor mounted at a fixed location external to the vehicle, and receive position information referenced to a global coordinate system about objects included in the infrastructure-based point cloud. The controller is configured to additionally register the vehicle-based point cloud with the infrastructure-based point cloud to determine a relationship between the vehicle-based coordinate system and the global coordinate system, and to use the position information about the objects included in the infrastructure-based point cloud and the relationship between the vehicle-based coordinate system and the global coordinate system to determine the vehicle position in the global coordinate system.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following detailed description is merely exemplary in nature and is not intended to limit the application and uses. Furthermore, there is no intention to be bound by expressed or implied theory presented in the preceding technical field, background, brief summary or the following detailed description. As used herein, the term "module" refers to hardware, software, firmware, electronic control component, processing logic, and/or processor device, individually or in a combination thereof, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

Figure 1:
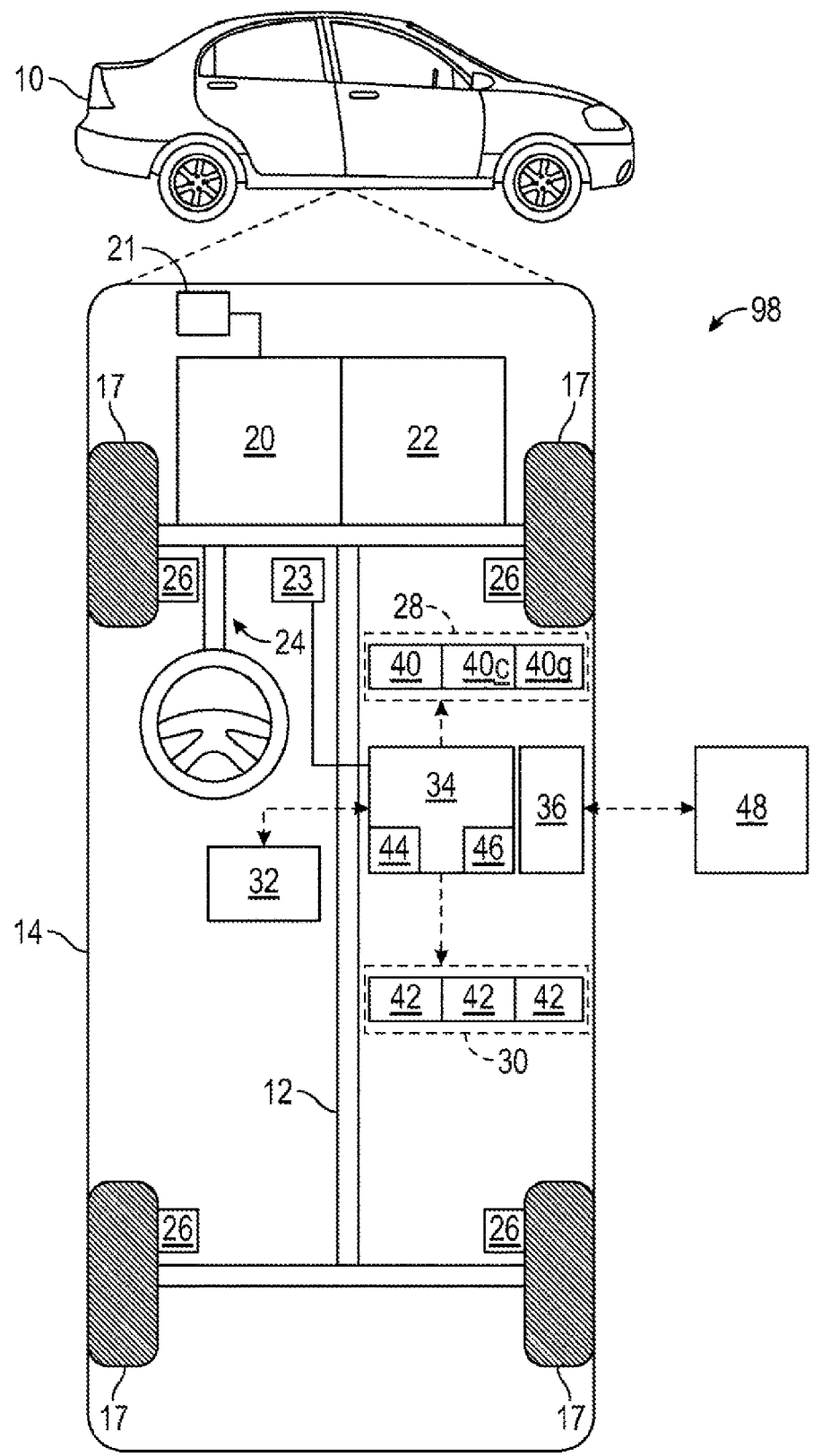
FIG. 1 is a schematic block diagram of a vehicle according to an exemplary embodiment.

As depicted in FIG. 1, the vehicle 10 generally includes a chassis 12, a body 14, front and rear wheels 17. The body 14 is arranged on the chassis 12 and substantially encloses components of the vehicle 10. The body 14 and the chassis 12 may jointly form a frame. The wheels 17 are each rotationally coupled to the chassis 12 near a respective corner of the body 14.

In various embodiments, the vehicle 10 may be an autonomous vehicle and a control system 98 is incorporated into the vehicle 10. The vehicle 10 is, for example, a vehicle that is automatically controlled to carry passengers from one location to another. The vehicle 10 is depicted in the illustrated embodiment as a passenger car, but it should be appreciated that another vehicle including motorcycles, trucks, sport utility vehicles (SUVs), recreational vehicles (RVs), marine vessels, aircraft, etc., can also be used. In an exemplary embodiment, the vehicle 10 is a so-called Level Four or Level Five automation system. A Level Four system indicates "high automation", referring to the driving mode-specific performance by an automated driving system of aspects of the dynamic driving task, even if a human driver does not respond appropriately to a request to intervene. A Level Five system indicates "full automation", referring to the full-time performance by an automated driving system of aspects of the dynamic driving task under a number of roadway and environmental conditions that can be managed by a human driver.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an electric machine such as a traction motor and/or a fuel cell propulsion system. The vehicle 10 further includes a battery (or battery pack) 21 electrically connected to the propulsion system 20. Accordingly, the battery 21 is configured to store electrical energy and to provide electrical energy to the propulsion system 20. Additionally, the propulsion system 20 may include an internal combustion engine. The transmission system 22 is configured to transmit power from the propulsion system 20 to the vehicle wheels 17 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 17. The brake system 26 may, in various embodiments, include friction brakes, brake by wire, a regenerative braking system such as an electric machine, and/or other appropriate braking systems. The steering system 24 influences a position of the vehicle wheels 17. While depicted as including a steering wheel for illustrative purposes, in some embodiments contemplated within the scope of the present disclosure, the steering system 24 may not include a steering wheel.

The sensor system 28 includes one or more sensors 40 (i.e., sensing devices) that sense observable conditions of the exterior environment and/or the interior environment of the vehicle 10. The sensors 40 may include, but are not limited to, radars, lidars, global positioning systems, optical cameras, thermal cameras, ultrasonic sensors, and/or other sensors. The actuator system 30 includes one or more actuator devices 42 that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered). The sensor system 28 includes one or more Global Positioning System (GPS) transceiver 40$g$ configured to detect and monitor the route data (i.e., route information). The GPS transceiver 40$g$ is configured to communicate with a GPS to locate the position of the vehicle 10 in the globe. The GPS transceiver 40$g$ is in electronic communication with the controller 34. Because the sensor system 28 provides object data to the controller 34, the sensor system 28 and its sensors 40 are considered sources of information (or simply sources). The sensor system 28 also includes one or more optical cameras 40c. The representation of the optical camera 40c in FIG. 1 is intended merely to show the inclusion of the optical camera 40c and is not intended to imply any limitations on the location or the field of view of the optical camera 40c.

The data storage device 32 stores data for use in automatically controlling the vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer non-transitory readable storage device or media 46. The processor 44 can be a custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, a combination thereof, or generally a device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using a number of known memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although a single controller 34 is shown in FIG. 1, embodiments of the vehicle 10 may include a number of controllers 34 that communicate over a suitable communication medium or a combination of communication mediums and that cooperate to process the sensor signals, perform logic, calculations, methods, and/or algorithms, and generate control signals to automatically control features of the vehicle 10.

In various embodiments, one or more instructions of the controller 34 are embodied in the control system 98 and. The vehicle 10 includes a user interface 23, which may be a touchscreen in the dashboard. The user interface 23 is in electronic communication with the controller 34 and is configured to receive inputs by a user (e.g., vehicle operator). Accordingly, the controller 34 is configured receive inputs from the user via the user interface 23. The user interface 23 includes a display configured to display information to the user (e.g., vehicle operator or passenger).

Figure 2:
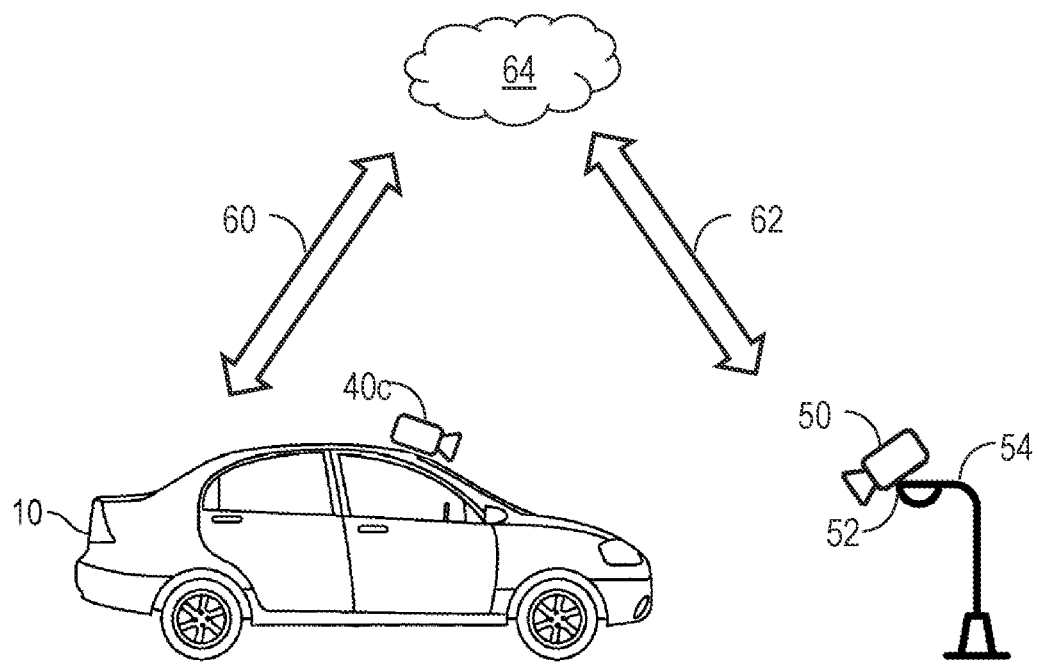
FIG. 2 is a schematic diagram of a vehicle in the vicinity of an infrastructure camera according to an exemplary embodiment.

The communication system 36 is configured to wirelessly communicate information to and from other entities 48, such as but not limited to, other vehicles ("V2V" communication), infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. Accordingly, the communication system 36 may include one or more antennas and/or transceivers for receiving and/or transmitting signals, such as cooperative sensing messages (CSMs).

FIG. 1 is a schematic block diagram of the control system 98, which is configured to control the vehicle 10. The controller 34 of the control system 98 is in electronic communication with the braking system 26, the propulsion system 20, and the sensor system 28. The braking system 26 includes one or more brake actuators (e.g., brake calipers) coupled to one or more wheels 17. Upon actuation, the brake actuators apply braking pressure on one or more wheels 17 to decelerate the vehicle 10. The propulsion system 20 includes one or more propulsion actuators for controlling the propulsion of the vehicle 10. For example, as discussed above, the propulsion system 20 may include an internal combustion engine and, in that case, the propulsion actuator may be a throttle specially configured to control the airflow in the internal combustion engine. The sensor system 28 may include one or more accelerometers (or one or more gyroscopes) coupled to one or more wheels 17. The accelerometer is in electronic communication with the controller 34 and is configured to measure and monitor the longitudinal and lateral accelerations of the vehicle 10. The sensor system 28 may include one or more speed sensors configured to measure the speed (or velocity) of the vehicle 10. The speed sensor is coupled to the controller 34 and is in electronic communication with one or more wheels 17.

The aforementioned GPS transceiver 40g can be utilized to determine the geographic coordinates (e.g., latitude and longitude) of the vehicle 10 unless the vehicle 10 is located in a GPS denied environment. Examples of a GPS denied environment include urban canyons where the street is flanked by buildings on both sides creating a canyon-like environment, indoor parking structures, tunnels, etc. In such an environment, signals from GPS satellites may be blocked or may be subject to multipath effects, rendering GPS unreliable for determining the absolute position of the vehicle 10.

Visual Odometry (VO) may be used to help determine the position of the vehicle 10 in a GPS denied environment. As used herein, the term Visual Odometry refers to a process of determining distance and/or heading information using sequential camera images to estimate the distance or direction traveled. Additionally or alternatively, an inertial measurement unit (IMU) may be employed in a GPS denied environment. As used herein, the term IMU refers to a device that detects linear acceleration, rotational rate and/or heading using one or more accelerometers, gyroscopes, and/or magnetometers. VO and/or IMU information can be used to estimate changes in vehicle position over time intervals when GPS information is not available. Both VO and IMU have the disadvantage that positioning errors can accumulate if GPS signals are lost for an extended period of time.

To improve upon the uncertainties in determining vehicle position in a GPS-denied environment, in an aspect of the present disclosure image data captured by a fixed-position infrastructure camera is leveraged to enhance vehicle positioning accuracy. As used herein, the term infrastructure camera refers to an image capture device having a known position in global coordinates (e.g., latitude, longitude, altitude, azimuth, elevation angle from horizontal). Examples of infrastructure cameras include traffic cameras and security cameras. Infrastructure cameras are commonly mounted to a fixed support structure (such as a building, gantry, or utility pole). If the camera mount allows the camera to swivel over a range of azimuth and/or elevation angle, capturing the azimuth and elevation angles at the time of image capture allows the image data to be processed as if the camera was rigidly mounted.

Referring to FIG. 2 and again to FIG. 1, the vehicle 10 is depicted in proximity to a fixed-position infrastructure camera 50. The infrastructure camera is affixed by a camera mount 52 to a camera support structure 54 located at a fixed location (latitude, longitude, and altitude) relative to the earth. The vehicle-mounted optical camera 40c is located to allow capture of image information in an area exterior to the vehicle 10. It will be appreciated that for some locations and orientations of the vehicle 10, the field of view of the vehicle-mounted optical camera 40c will overlap the field of view of the infrastructure camera 50, i.e., objects in the overlapping region can be captured by both the vehicle-mounted optical camera 40c and by the infrastructure camera 50. FIG. 2 also depicts a data storage pool 64 in two-way communication with the vehicle 10 by means of a vehicle communication link 60. The data storage pool 64 is also in two-way communication with the infrastructure camera 50 by means of a camera communications link 62. Although not shown in FIG. 2, the vehicle 10 may also be in direct communication with the infrastructure camera 50. Communication along the communication links 60, 62 may be achieved by any of several available protocols, including but not limited to cellular (4G/5G), dedicated short-range communications (DSRC), and cellular-vehicle-to-everything (C-V2X).

Objects captured by the vehicle-mounted optical camera 40c and/or by the infrastructure camera 50 may be generally categorized as stationary, semi-dynamic, or dynamic. Examples of stationary objects include but are not limited to building structures, signs, fire hydrants, ground markings, traffic lights, and other similar objects which may reasonably expected to be in the same location for considerable periods of time. Semi-dynamic objects include objects that are moveable but are not in constant motion. Examples of semi-dynamic objects include but are not limited to parked vehicles, traffic cones, traffic dividers, and the like. Dynamic objects are objects whose location may be reasonably expected to change often, including but not limited to vehicle traffic, pedestrians, and the like.

In an aspect of the present disclosure, image data from the infrastructure camera 50 is processed to obtain a first 3D point cloud. As used herein the term point cloud is understood to mean a set of data points in space representing 3D objects captured in the image data. Each data point in the first 3D point cloud has a set of Cartesian (x, y, z) coordinates representing the location of a physical point on the external surface of the corresponding object captured in the image data, relative to the location of the infrastructure camera 50. Photogrammetry methods, which are known in the art, are used to produce the point cloud from the captured image data. Because the geographic coordinates (i.e., latitude and longitude) of the fixed infrastructure camera 50 are known, the geographic coordinates of each data point in the first 3D point cloud can be readily determined from the Cartesian coordinates of the data point.

Similarly, image data from the vehicle-mounted optical camera 40c is processed using photogrammetry methods to obtain a second 3D point cloud. Each data point in the second 3D point cloud has a set of Cartesian (x, y, z) coordinates representing the location of a physical point on the external surface of the corresponding object captured in the image data, relative to the location of the vehicle-mounted optical camera 40c on the vehicle 10.

Registration is performed on the first point cloud and the second point cloud. Registration is a process of finding a spatial transformation, such as translation, rotation, and scaling, to align the first point cloud and the second point cloud and thereby associate visual features received from the fixed infrastructure camera 50 with visual features received from the vehicle-mounted optical camera 40c. The geographic coordinate information (e.g., latitude and longitude) for visual features in the first point cloud can be combined with the Cartesian coordinates (e.g., x, y, z relative to vehicle) for the corresponding visual features in the second point cloud to calculate latitude and longitude information for the vehicle 10.

Figure 3:
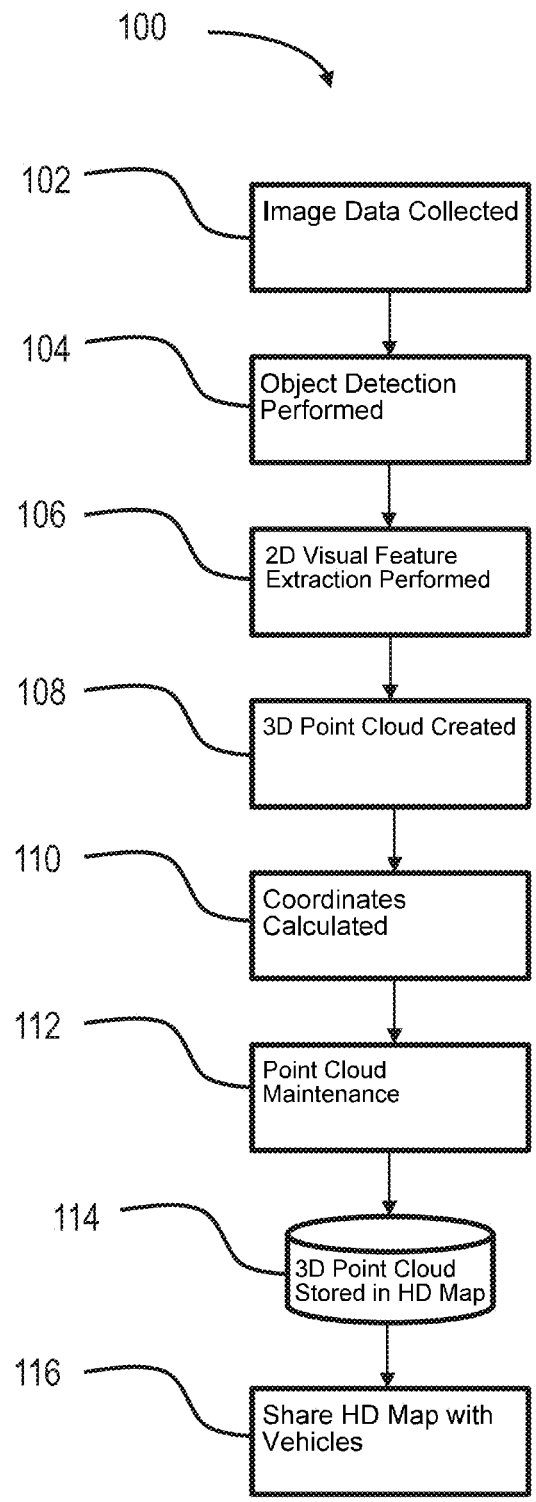
FIG. 3 is a flowchart of a method for creating an infrastructure point cloud according to an exemplary embodiment.

Referring to FIG. 3, a flow chart of an algorithm 100 is presented depicting a non-limiting example of a method for generating the first point cloud from visual data from the fixed infrastructure camera 50. In step 102, image data is collected from the infrastructure camera 50. In step 104, object detection is performed on the image data to detect objects captured in the image data. As a non-limiting example, a "you only look once" (YOLO) algorithm may be used for object detection. In step 106, 2D visual feature extraction is performed from the image data and the 2D visual features are labeled with their object types. Non-limiting examples of object types include building structures, signs, fire hydrants, ground markings, traffic lights, vehicles, traffic cones, traffic dividers, etc.

With continued reference to FIG. 3, in step 108 a first 3D point cloud is created or updated with the 2D visual features. Since the 2D visual features are labeled with their object types, the corresponding 3D points in the first point cloud can also be labeled with object types. In step 110, geographic coordinates (e.g., latitude and longitude) are calculated for the 3D points in the first point cloud and their corresponding 2D visual features. Since the location of the infrastructure camera 50 is pre-surveyed, the geographic coordinates of each 3D point can readily be converted from the local point cloud coordinate system (i.e., position relative to the infrastructure camera 50) to the global geographic coordinate system.

In step 112, maintenance is performed on the first 3D point cloud. This step may include deleting 3D points from a previously stored version of the first point cloud to remove points that are no longer detected. Based on the object type (e.g., stationary or semi-dynamic), associated with the point, different refresh time values may be associated with different points. Optionally, image data from vehicles in the vicinity of the infrastructure camera 50 may be used in conjunction with image data from the infrastructure camera 50 to augment maintenance of the first point cloud in step 112.

In step 114, the refreshed first 3D point cloud from step 112 is stored in a high-definition (HD) map. In step 116, the HD map is made available to be shared with vehicles that may be in the vicinity of the infrastructure camera 50 in the future. In an exemplary embodiment, the HD map may be stored in the data storage pool 64 depicted in FIG. 2. Alternatively, the HD map may be stored in a local data storage pool associated with the infrastructure camera 50. The algorithm 100 for generating the first point cloud may be executed by a processor located in the data storage pool 64 or in a local data storage pool associated with the infrastructure camera 50, without deviating from the gist of the present disclosure.

Figure 4:
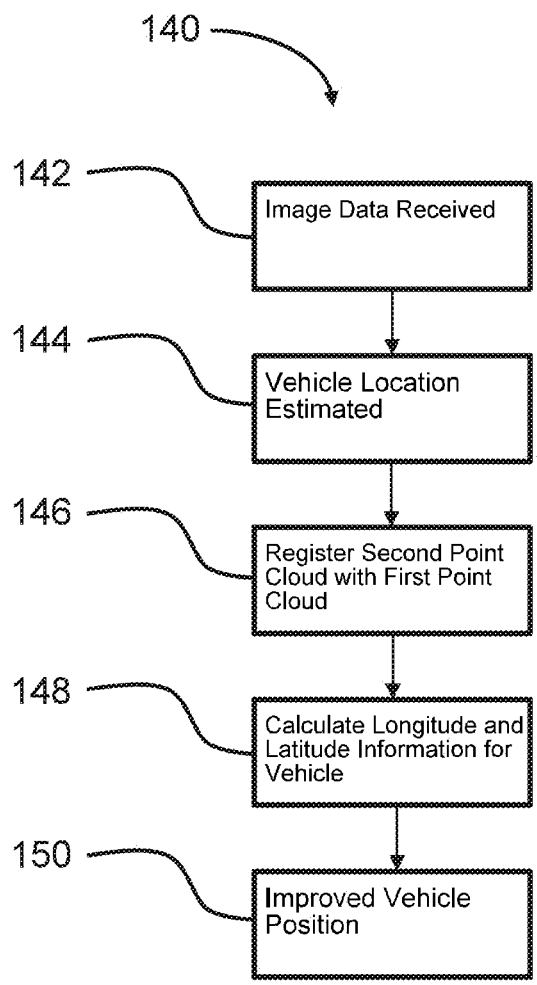
FIG. 4 is a flowchart of a method for real-time calculation of the vehicle position according to an exemplary embodiment.

Referring to FIG. 4, an algorithm 140 for calculating the position of the vehicle 10 in real-time is depicted. In step 142, image data is received from the vehicle-mounted optical camera 40c and a second point cloud is generated in a manner similar to the generation of the first point cloud described with respect to FIG. 3. In step 144, the present location of the vehicle 10 is estimated. The estimate of the present location of the vehicle 10 may be based on a previous determination of the location of the vehicle from GPS data, potentially modified by visual odometry using image data received in step 142 and/or by inertial measurement information. In step 146, the second point cloud generated in step 142 is registered with a first point cloud generated from image data obtained by an infrastructure camera 50 located in the vicinity of the estimated present vehicle location determined in step 144, to associate visual features received from the fixed infrastructure camera 50 with visual features received from the vehicle-mounted optical camera 40c. In step 148, the geographic coordinate information (e.g., latitude and longitude) for visual features in the first point cloud is combined with the Cartesian coordinates (e.g., x, y, z relative to vehicle) for the corresponding visual features in the second point cloud to calculate latitude and longitude information for the vehicle 10. In step 150, the improved vehicle position information from step 148 is made available for subsequent use.

An algorithm for calculating vehicle position in real time such as algorithm 140 presented in FIG. 4 may be executed in the vehicle 10, for example by controller 34. Alternatively, the algorithm 140 for calculating vehicle position in real time may be executed by a processor located separate from the vehicle, such as in the data storage pool 64 or in a local data storage pool associated with the infrastructure camera 50, without deviating from the gist of the present disclosure.

Figure 5:
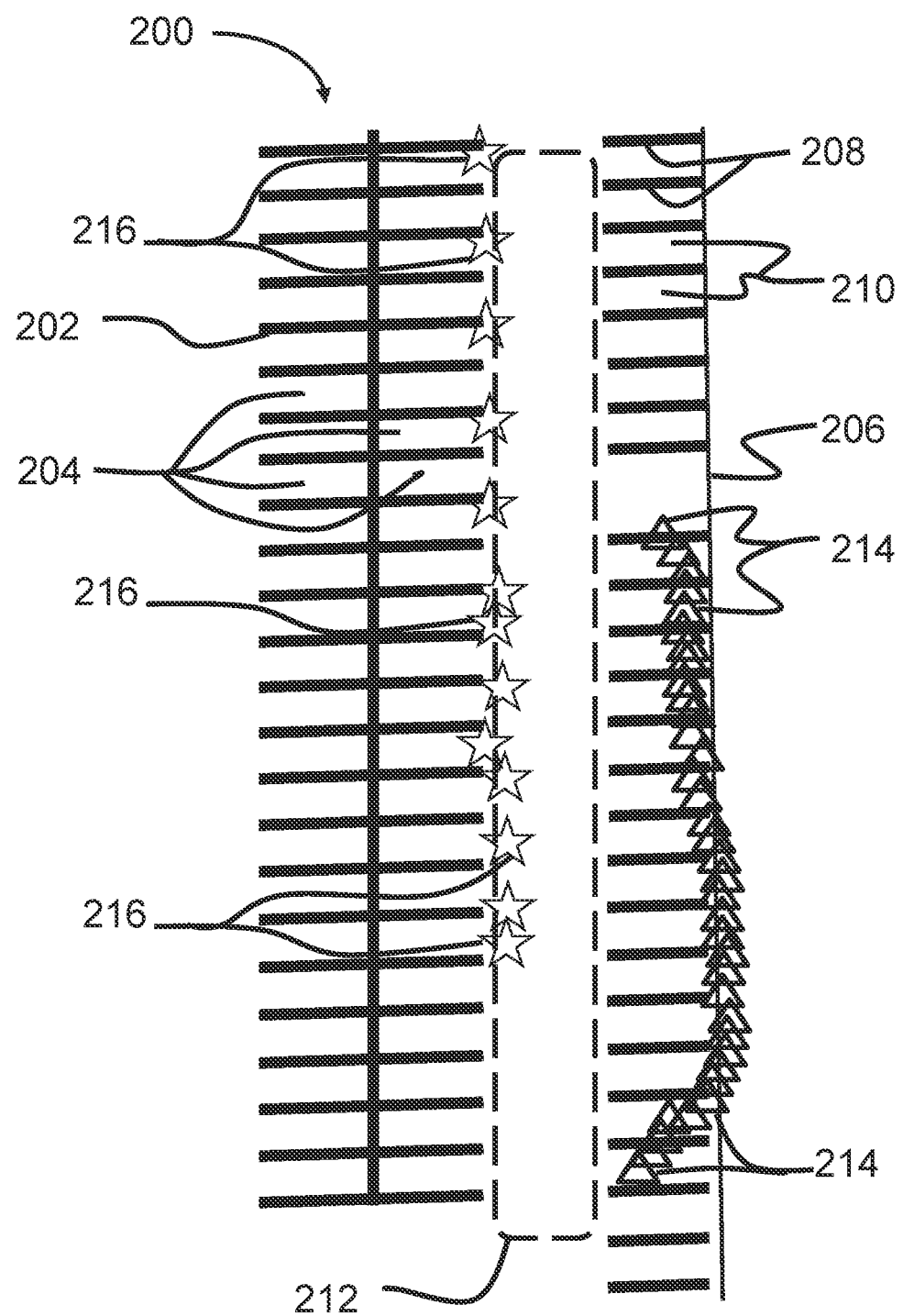
FIG. 5 is a presentation of results from a proof-of-concept experiment comparing position determining systems in a GPS-denied environment.

FIG. 5 presents results from a proof-of-concept experiment comparing a point-cloud-based position determining system as disclosed herein with a GPS based position determining system in a GPS-denied environment. The experiment was performed with a vehicle driving on the lowest level of a multilevel parking structure where GPS signals are blocked by higher levels of the parking structure. The first point cloud (infrastructure based) was developed using a single camera installed at a height of 2.2 m above the parking surface. The vehicle had an optical camera installed to capture images from which the second point cloud (vehicle based) could be created. The vehicle was also equipped with a GPS unit to capture baseline data to which the point-cloud-based position determining system could be compared.

With continued reference to FIG. 5, a plan view of a portion of a parking deck surface 200 is depicted. Markings 202 are painted on part of the parking deck surface 200, defining a plurality of parking spaces 204 for face-to-face parking. For the sake of clarity not every parking space 204 is labeled, but it is to be understood that parking spaces 204 are defined along the entire extent of the markings 202. A wall 206 defines a limit to the parking surface 200. Additional markings 208 are painted on the parking surface near the wall 206 to define additional parking spaces 210. Again, for the sake of clarity, neither every additional marking 208 nor every parking space 210 is labeled, but it is to be understood that the markings 208 and parking spaces 210 extend substantially along the extent of the wall 206. The markings 202 and 208 define a traffic lane 212 indicated by a dashed box between the rows of parking spaces 204, 210.

As part of the proof-of-concept experiment, a vehicle was driven on the lower level of the parking structure in the traffic lane 212 defined between the rows of the parking spaces 204, 210. As the vehicle was driven, the position of the vehicle was estimated by using GPS and by using a point-cloud-based method as described above. The triangles 214 represent the track of the GPS estimates. While not every triangle 214 is labeled in FIG. 5, each triangle shown in FIG. 5 represents a point along the track estimated by GPS. The stars 216 represent the track of the point-cloud-based location estimates. While not every star 216 is labeled in FIG. 5, each star shown in FIG. 5 represents a point along the track estimated by the point-cloud-based method. Because the experiment was conducted in a GPS-denied environment, the GPS estimates include significant position error, as evidenced by the track represented by the triangles 214 intersecting the wall 206 that physically defines a limit to the parking surface 200. It can be seen that the point-cloud-based estimates include less position error than the GPS based estimates represented by the triangles, as evidenced by the stars substantially coinciding with the traffic lane 212.

While the foregoing description refers to images captured by a vehicle-mounted camera 40c and by an infrastructure camera 50, it is not intended that the teachings of the present disclosure be limited to images captured by an optical camera. Alternative image sensor technologies including but not limited to lidar and/or radar may be used to capture images to be processed in accordance with the present disclosure without departing from the spirit and scope of the disclosure.

A method and system of the present disclosure for determining the position of a vehicle offers several advantages. These include enabling advanced driving assistance features that might not otherwise be available, especially in urban environments where GPS signals may not be sufficiently robust. Automated valet parking and wireless EV charger alignment are but two examples of features that may benefit from the method and system disclosed herein. Additionally, in some aspects, the vehicle is not only a consumer of enhanced position information, but can also be a provider of information to allow updates to an infrastructure-based resource to benefit other vehicles.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of determining a vehicle position, comprising:
   generating a vehicle-based point cloud, wherein the vehicle-based point cloud includes a plurality of vehicle-based objects in proximity to the vehicle detected by a sensor mounted to the vehicle, and wherein the vehicle-based point cloud is referenced to a vehicle-based coordinate system, wherein generating the vehicle-based point cloud of objects in proximity to the vehicle comprises:
      receiving image data from the sensor mounted to the vehicle;
      performing object detection on the image data received from the sensor mounted to the vehicle;
      performing 2D visual feature extraction from the image data received from the sensor mounted to the vehicle;
      labeling the 2D visual features from the image data received from the sensor mounted to the vehicle with their object type;
      creating or updating a vehicle-based 3D point cloud with the 2D visual features from the image data received from the sensor mounted to the vehicle; and
      calculating geographic coordinates in the vehicle-based coordinate system for points in the vehicle-based 3D point cloud with the 2D visual features from the received image data from the sensor mounted to the vehicle;
   updating the vehicle-based point cloud from the plurality of vehicle-based objects detected in proximity to the vehicle detected by the sensor mounted to the vehicle;
   receiving an infrastructure-based point cloud of a plurality of infrastructure-based objects detected by a sensor mounted at a fixed location external to the vehicle, wherein the infrastructure-based point cloud is generated by:
      collecting image data from the sensor mounted at the fixed location external to the vehicle;
      performing object detection on the collected image data from the sensor mounted at the fixed location external to the vehicle;
      performing 2D visual feature extraction from the collected image data from the sensor mounted at the fixed location external to the vehicle;
      labeling the 2D visual features from the collected image data from the sensor mounted at the fixed location external to the vehicle with their object type;
      creating or updating an infrastructure-based 3D point cloud with the 2D visual features from the collected image data from the sensor mounted at the fixed location external to the vehicle; and
      calculating geographic coordinates in a global coordinate system for points in the infrastructure-based 3D point cloud with the 2D visual features from the collected image data from the sensor mounted at the fixed location external to the vehicle;
   receiving position information referenced to the global coordinate system for the plurality of infrastructure-based objects included in the infrastructure-based point cloud;
   registering the plurality of vehicle-based objects in the vehicle-based point cloud with the plurality of infrastructure-based objects in the infrastructure-based point cloud to determine a relationship between the vehicle-based coordinate system and the global coordinate system;
   using the position information about the plurality of infrastructure-based objects in the infrastructure-based point cloud and the relationship between the vehicle-based coordinate system and the global coordinate system to determine the vehicle position in the global coordinate system; and
   using the determined vehicle position in the global coordinate system to command a vehicle action.

2. The method of claim 1, wherein the sensor mounted to the vehicle is an optical camera.

3. The method of claim 1, wherein the sensor mounted to the vehicle is a lidar sensor.

4. The method of claim 1, wherein the sensor mounted to the vehicle is a radar sensor.

5. The method of claim 1, wherein the sensor mounted at the fixed location external to the vehicle is an optical camera.

6. The method of claim 1, wherein the sensor mounted at the fixed location external to the vehicle is a lidar sensor.

7. The method of claim 1, wherein the sensor mounted at the fixed location external to the vehicle is a radar sensor.

8. The method of claim 1, wherein the vehicle position is determined by a controller located in the vehicle.

9. The method of claim 1, wherein the vehicle position is determined by a processor located in a remote data storage pool.

10. The method of claim 1, wherein the vehicle position is determined by a processor located in a local data storage pool associated with the sensor mounted at the fixed location external to the vehicle.

11. A system comprising:
    a vehicle; an image sensor mounted to the vehicle; and a controller configured to:
       generate a vehicle-based point cloud of objects in proximity to the vehicle, the vehicle-based point cloud referenced to a vehicle-based coordinate system;
       receive an infrastructure-based point cloud of objects detected by a sensor mounted at a fixed location external to the vehicle;
       receive position information referenced to a global coordinate system about objects included in the infrastructure-based point cloud;
       register the objects included in the vehicle-based point cloud with the objects included in the infrastructure-based point cloud to determine a relationship between the vehicle-based coordinate system and the global coordinate system; and
       use the position information about the objects included in the infrastructure-based point cloud and the relationship between the vehicle-based coordinate system and the global coordinate system to determine the vehicle position in the global coordinate system,
    wherein the infrastructure-based point cloud is generated by:
       collecting image data from the sensor mounted at the fixed location external to the vehicle;
       performing object detection on the collected image data from the sensor mounted at the fixed location external to the vehicle;
       performing 2D visual feature extraction from the collected image data from the sensor mounted at the fixed location external to the vehicle;
       labeling the 2D visual features from the collected image data from the sensor mounted at the fixed location external to the vehicle with their object type;
       creating or updating an infrastructure-based 3D point cloud with the 2D visual features from the collected image data from the sensor mounted at the fixed location external to the vehicle; and calculating geographic coordinates in the global coordinate system for points in the infrastructure-based 3D point cloud with the 2D visual features from the collected image data from the sensor mounted at the fixed location external to the vehicle, wherein the vehicle-based point cloud of objects in proximity to the vehicle is generated by a method comprising:

receiving image data from the sensor mounted to the vehicle;

performing object detection on the collected image data received from the sensor mounted to the vehicle;

performing 2D visual feature extraction from the image data received from the sensor mounted to the vehicle;

labeling the 2D visual features from the image data received from the sensor mounted to the vehicle with their object type;

creating or updating a vehicle-based 3D point cloud with the 2D visual features from the image data received from the sensor mounted to the vehicle; and calculating geographic coordinates in the vehicle-based coordinate system for points in the vehicle-based 3D point cloud with the 2D visual features from the image data received from the sensor mounted to the vehicle.

12. The system of claim 11, wherein the sensor mounted to the vehicle is an optical camera.

13. The system of claim 11, wherein the sensor mounted to the vehicle is a lidar sensor.

14. The system of claim 11, wherein the sensor mounted to the vehicle is a radar sensor.

* * * * *